Patented July 14, 1936

2,047,225

UNITED STATES PATENT OFFICE 2,047,225

EMULSION

George W. Rigby, Wilmington, Del., assignor to E. I. du Pont de Nemours & Company, Wilmington, Del., a corporation of Delaware No Drawing. Application March 15, 1935, Serial No. 11,274

19 Claims. (Cl. 91—68)

This invention relates to emulsions, and more particularly emulsions of materials dispersed in aqueous solutions of salts of deacetylated chitin.

This invention deals with a material only recently available to the art, namely, acid soluble partially deacetylated chitin. In copending application of George W. Rigby, Serial No. 731,600 filed June 21, 1934, there is disclosed a method for the preparation of suitable deacetylated chitin. In this method shrimp, lobster or crab shells, freed from contaminant adherent material, such as flesh, by treatment with 1% solution of soda ash at the boiling temperature, then freed from lime salts by treatment with 5% hydrochloric acid followed by a second boiling with 1% soda ash solution, is deacetylated by treatment with caustic alkali at an elevated temperature for a considerable time, for example, with 40% sodium hydroxide at 110° C. for about four hours. The material thus obtained contains from 20% to 90% and preferably 70% to 90% of its nitrogen in the form of free amino groups.

The viscosity of the solutions made from the deacetylated chitin is markedly influenced by the treatment. More drastic treatment than that given above results in a material of considerably lower viscosity. Less drastic treatment than that above described results in a material of increased viscosity. A material obtained by a given treatment may be increased in viscosity by heating for a suitable length of time, or decreased in viscosity by the addition of suitable oxidizing agent, such as hydrogen peroxide, to an aqueous solution of a salt or to a suspension of the solid.

This invention has as an object the preparation of useful emulsions. A further object is the preparation of useful coating compositions. A still further object is the preparation of impregnating compositions. A still further object is the class of coated and/or impregnated objects obtained by applying emulsions to suitable base materials. Other objects will appear hereinafter.

These objects are accomplished by the following invention, wherein a material which can be liquefied under the conditions of emulsification is emulsified in a solution of a salt of deacetylated chitin.

In the process of the present invention a material which is either a liquid per se or which is liquefied under the conditions of manufacture, is emulsified in a suitable solution of deacetylated chitin acetate. The material may be a liquid normally, or it may be such as paraffin, which requires fusion to bring it into the liquid state, or such as a resin, which requires a solvent to bring it into the liquid state. In any case, however, the material to be emulsified is in the liquid state when emulsified according to the processes of the present invention. The liquid material is mixed with the aqueous solution of a salt of deacetylated chitin in a suitable apparatus such as a colloid mill, high speed stirrer, orifice mixer, etc.

Having outlined above the general purposes and principles of the invention, the following applications thereof to certain specific instances are included for purposes of illustration and not in limitation.

Example 1

A. China-wood oil, a substance, normally liquid, was emulsified by adding 25 parts by weight of the liquid to 75 parts of a vigorously agitated solution containing 0.75 part of high viscosity deacetylated chitin acetate. The crude emulsion was much improved in stability by passage thru a colloid mill. This emulsion was quite fluid, was readily shaken up, and except for a slight cream which readily shook up was stable for 25 weeks.

In emulsifying China wood oil, as little as 0.5% of deacetylated chitin as acetate has been used to give a stable 50% emulsion while the upper limit is determined only by the viscosity of the resulting emulsion.

B. A paraffin emulsion, stable for an indefinite period, was prepared by pouring 20 parts by weight of melted paraffin into 80 parts of a vigorously stirred solution of medium viscosity deacetylated chitin acetate heated above the melting point of the paraffin and containing 2 parts of deacetylated chitin. The crude and unstable emulsion thus prepared was improved and stabilized by passage thru a heated colloid mill. The emulsion was quite fluid, showed almost no tendency to cream and could be readily diluted with a large volume of water.

C. An emulsion of an 85% solution of linseed oil modified polyhydric alcohol polybasic acid resin in mineral spirits was prepared as "A", 2.5% of high viscosity shrimp deacetylated chitin as acetate based on the resin being used for a 29% emulsion of resin. This emulsion was quite fluid, creamed slightly but shook up readily, diluted well with water and remained stable for weeks.

The above examples are illustrative of the emulsification of oils, waxes and solutions. Other water insoluble materials which have given satisfactory emulsions include castor oil, blown castor oil, hydrogenated castor oil, hydrogenated soya bean oil, neat's foot oil, liquid petrolatum, linseed oil, carnauba wax, wax mixtures as carnauba-paraffin, carnauba-paraffin-spindle oil-toluol, carnauba-beeswax, stearic acid, stearyl alcohol, "Vaseline", salicylanilide, triacetin, methoxyethyl adipate, tricresyl phosphate, chlorinated diphenyl, dibutyl phthalate, dichlorodiethyl ether-diphenyloldimethyl methane, and similar ether resins, methyl methacrylate resin, and the like.

For the preparation of emulsions, soluble salts of deacetylated chitin in general are used. These are normally prepared by dissolving the equivalent of 161 parts of deacetylated chitin in at least 0.8 mol. of aqueous acid. Because of the low cost and volatility of acetic acid and the non-foaming characteristics of the acetate, the acetate is particularly desirable.

Other soluble deacetylated chitin salts can be used such as the formate, adipate, pyruvate, maleate, anthranilate, benzoate, lactate tartarate and others as disclosed in copending application of George W. Rigby, Serial No. 731,600, filed June 21, 1934. In general the shorter chain organic acids have the advantage of not producing foam while the sebacate and some other salts foam very extensively. Acid-soluble chitinous products, such as deacetylated products from shrimp, crab and from mycelium, from fungi such as *Aspergillus niger* have been used.

The deacetylated chitin may be used in widely varying (solution) viscosities, i. e., deacetylated chitin may be used whose viscosities (in 5% concentration in 5% acetic acid) are as low as less than one or as high as many thousands of poises. The preferred materials have (solution) viscosities of above 5 poises as above measured. In general, the emulsions with high viscosity materials can be used with lower proportion of deacetylated chitin to give emulsions of equal stability. The concentration or proportion of deacetylated chitin can be varied extensively, and while the lower limit is less than 0.5% of the material emulsified in some cases, from 2% to 10% is a generally preferred proportion altho as high as 500% or even 1000% may be preferred in some cases.

While oil-in-water type emulsions are generally the more stable, pouring of the deacetylated chitin solutions into the agitated liquids often produces the water-in-oil type of emulsions.

Emulsions may include other acid stable materials in addition to the deacetylated chitin and emulsified material, for example, additional emulsifying agents or wetting agents as glue, gum tragacanth, cetyl- and dodecylpyridinium compounds, "hymolal salts", colloidal clays and many others which modify the emulsions, for example, by increasing ease of emulsification or stability on dilution. Other added materials may include mold inhibitors such as chlorocresol, etc., soluble liquids as formamide or glycerine, or other softeners and plasticizers which may or may not be themselves emulsified, soluble salts, acids in suitable concentrations, fixing agents, anti-oxidants, inhibitors of skin formation as saponin or catechol, penetration assistants such as hydroxyethyldimethyloctadecylammonium chloride, surface tension reducing agents such as ethyl malonate, chemical reactants or potential reactants for the amine group as aldehydes, and others. These may be added before, during or after emulsification.

The emulsions already described are useful for many purposes. Such emulsions of medicinal oils such as cod liver oil are stable to acid. When added to various aqueous suspensions or dispersions as paper pulp, pigment dispersions or the like and the emulsion broken by suitable chemical treatment as with alkali, emulsions give materials sized with the emulsified substances.

Especially important uses of emulsions are in the coating or impregnating of base materials. When suitable emulsions are applied to water impervious base materials and allowed to dry, the emulsified material is fixed to the base in the form of a coating. Thus, a paraffin emulsion so applied and dried gives a white coating. Water impervious base materials are those which are not visibly affected, that is, softened or swelled by brief contact with water, such as stone, glass, metals and the like. When emulsions are applied to porous base materials, such as silk, wool, cotton, linen, rayon, or other threads or fabrics, paper, leather, cork, wood, plaster, brick, tile, concrete, etc., more or less of the emulsion penetrates into or impregnates the pores so that on drying a more or less composite article is obtained rather than one merely surface coated. The degree of impregnation can be greatly varied by varying the concentration and viscosities of the emulsions. By "porous" is meant a material showing pores, cells, crevices or capillaries when viewed under low-power microscope and includes cork, plaster, cement, and the like. When emulsions are applied to fibrous base materials, that is, those showing orientation in one or more directions or materials containing fibers interminged thruout the material, such as wood, paper, fabric, leather and the like, and dried, the resulting coating is well fixed.

When the emulsions are applied to a base material and then dried or heated, several results are possible. In the first and simplest instance water may evaporate, in which case the resultant films are slowly redissolved when put into water. The second case is that in which acid is also lost by volatilization, which is especially true of the more volatile acids. In such cases the dried films may be swollen by water but are not dissolved, but solution takes place readily in acid. Similar results are obtained if the base to which the solution is applied absorbs the acid in any way. The third case is that in which, due to the drying and heating, the amine salt is dehydrated to form the water and acid insoluble amide, that is

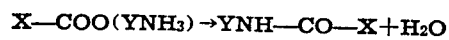

$$X\text{---}COO(YNH_3) \rightarrow YNH\text{---}CO\text{---}X + H_2O$$

In this case the regenerated chitin or chitin-like material is no longer soluble in either water or acid. A further case is that in which the salt is of a dibasic acid in which case other reactions such as imide or cyclic imide formation may take place. In the case of the phthalic acid salt, heating gives a compound insoluble in acid but soluble in alkaline media. A still further effect of heating is that of simple insolubilization, that is, deacetylated chitin itself may be rendered insoluble in water, acid or alkaline media by heating for a suitable length of time. In addition to heat treatments, chemical treatments may be used to insolubilize the deacetylated chitin. Alkaline treatments as with ammonia remove the acid and render the product water insoluble. Treatment with materials in general which react with amines has an insolubilizing effect. Thus, treatment with formaldehyde or other aldehydes, acetyl chloride or other acid chloride, acetic anhydride or other anhydrides, insolubilizes the film of deacetylated chitin.

The emulsions may be used in various concentrations. When dilute systems are desired the water is stirred in until the proper concentration is reached. The emulsions can be applied by brushing, dipping, printing, or the like. The application may be on paper, wood, cloth or other textile materials, leather, nitrocellulose coated fabric, rubber, lacquered, painted, varnished or enameled surfaces, glass, metal, linoleum, plaster, cement, wall board, and the like.

Paraffin emulsions may be used in illustration of the application of emulsions to a base material. These emulsions may be used alone or with added agents which serve as emulsifying, stabilizing, fixing, mold inhibiting, softening, wetting, or coloring agents, and which may be either soluble in the solution or dispersed therein. The following examples show the use of such emulsions.

*Example 2*

Twenty parts of paraffin were emulsified in 80 parts of solution containing 0.8 part of high viscosity deacetylated chitin as acetate. When this was brushed on paper and allowed to dry, an opaque coating was obtained which adhered to the paper, took a polish on being rubbed and was very resistant to water. A drop of water, standing on the coating for 30 minutes did not penetrate thru the paper, nor did rubbing the emulsion with water redisperse it.

Although with as small an amount as 2% of deacetylated chitin to paraffin, coatings could still be applied, those containing from 4% to 10% of deacetylated chitin are preferred. Heating of the coated sheets caused the paraffin to melt but did not lessen the opacity of the paper due to bleeding of the molten paraffin into it. This latter effect has also been obtained with drying and non-drying oils such as China wood oil and liquid petrolatum, in which cases water repellent coatings were obtained.

Emulsions of oils, resins and the like may be used for coating base materials. Emulsions have been made such that the coating when applied did not penetrate a porous base and also emulsions from which the oil did penetrate. Concentrations may be made as high or as low as desired, the lower concentrations having frequently been found desirable for dipping or impregnating materials, as in the waterproofing of fabrics. Emulsions are not limited to those of a single material but may comprise one or more oils, resins, waxes, driers, softeners, insecticides, mildew inhibitors, etc., to give desired properties to the coating, impregnating, polishing, water resisting, water repelling, etc., composition.

Resins, preferably in solution, may be emulsified using deacetylated chitin and the emulsions used for coating or impregnating fibrous materials such as paper, cloth, leather, wood, asbestos, etc., and coating other materials such as cement, metals, glass, and the like. Dependng upon the proportion of deacetylated chitin, resin, solvent, etc., which is employed, films have been laid down either porous to the slow transfer of water or impervious to water.

The adhesive and film-forming properties of deacetylated chitin together with its property of becoming relatively water insoluble on thorough drying, heating or treatment with alkaline materials or materials in general which react with amines, make the emulsions useful for coating or impregnating base materials. When applied to base materials by coating, brushing, dipping, impregnating, spraying or other means and drying, deacetylated chitin emulsions are fixed or anchored to the base, being resistant to rubbing, washing, laundering and the like. Waxes or oils in most cases do not bleed into the base to which they are anchored, even though the wax or oil is in the liquid state, so that the opacity of the base, such as paper, is not lost. Thus, water repellent finishes of good durability may be applied to many types of base materials without destroying their original opacity.

In the copending application of W. J. Merrill and D. M. McQueen Serial No. 11,273, filed March 15, 1935 there are disclosed particularly useful emulsions suitable for sizing or water proofing textiles and the like.

The emulsions of the present invention because of the wide range of waxes, oils, and other repellent liquids which may be dispersed, the miscibility of these emulsions with each other and with dispersions of solids in deacetylated chitin salt solutions, the stability of the emulsions e. g., to acids, fermentation, bacterial action, etc., the dilution capacity of the emulsions and the relatively slight effect of temperature on the emulsions, are widely applicable. The wide range of viscosities and concentrations of deacetylated chitin which may be used, together with the wide range of proportion of emulsified material render these emulsions capable of very accurate modification to suit exacting needs. Mixed emulsions are illustrative of this. Thus, an emulsion of a mixture of liquids is an emulsion of particles, each of which in general comprises the emulsified liquids while a mixture of emulsions comprises emulsified particles which are heterogeneous. Thus, with the same ultimate composition the emulsions are capable of small but sometimes highly important differences.

While the invention has been described in detail in terms of deacetylated chitin obtained from shrimp shells, the invention is generally applicable to the preparation of emulsions by the use, as an emulsifying agent, of deacetylated chitin insoluble in water or alkaline media, but soluble in aqueous organic acid media and depositing coherent films therefrom, i. e., organic-acid soluble deacetylated chitin. Instead of shrimp shell chitin, chitin derived from crab or lobster shells or from the outer integuments of insects such as locusts, grasshoppers, etc., or chitinous material from vegetable sources such as mycelium from fungi, may be used. A wider range of deacetylated chitin is available in this application of these matrials than in certain other applications. While for cementing agents it is desirable that the material be substantially undegraded, in the case of emulsifying agents, a greater range of degradation may be tolerated and even deacetylated chitins which give brittle films on evaporation often serve quite adequately as emplsifying agents.

In the claims the term "deacetylated chitin", if not modified by such terms as solution or salt, includes not only the deacetylated chitin itself but also derivatives thereof such as those obtained by drying or heating the solutions or the products obtained by insolubilization by chemical treatment such as by formaldehyde, anhydrides, or the like. The term "coating" is intended to include those methods of application disclosed thruout the case and includes impregnating as well as surface coating.

The above description and examples are intended to be illustrative only. Any modification of or variation therefrom which conforms to the spirit of the invention is intended to be included in the scope of the claims.

I claim:

1. Process of preparing emulsions which comprises agitating together a substantially water insoluble material liquid under the conditions of emulsification and an aqueous solution of a salt of deacetylated chitin.

2. Process of claim 1 wherein the agitation is effected by the use of a colloid mill.

3. An emulsion comprising a substantially water insoluble material, which is a liquid under the conditions of emulsification, emulsified in an aqueous solution of a salt of deacetylated chitin.

4. An emulsion comprising a substantially water insoluble material, which is a liquid under the conditions of emulsification, emulsified in an aqueous solution of an acetate of deacetylated chitin.

5. An emulsion comprising a wax emulsified in an aqueous solution of a salt of deacetylated chitin.

6. An emulsion comprising a wax emulsified in an aqueous solution of an acetate of deacetylated chitin.

7. A process of coating objects which comprises applying to a base material an emulsion comprising a water insoluble material, which is a liquid under the conditions of emulsification, emulsified in an aqueous solution of a salt of deacetylated chitin.

8. A process of coating objects which comprises applying to a base material an emulsion comprising a water insoluble material, which is a liquid under the conditions of emulsification, emulsified in an aqueous solution of an acetate of deacetylated chitin.

9. A process of coating objects which comprises applying to a base material an emulsion comprising a wax emulsified in an aqueous solution of a salt of deacetylated chitin.

10. A process of coating objects which comprises applying to a base material an emulsion comprising a wax emulsified in an aqueous solution of an acetate of deacetylated chitin.

11. A coated object having a coating thereon deposited from an emulsion comprising a water insoluble material, which is a liquid under the conditions of emulsification, emulsified in an aqueous solution of a salt of deacetylated chitin.

12. A coated object having a coating thereon deposited from an emulsion comprising a water insoluble material, which is a liquid under the conditions of emulsification, emulsified in an aqueous solution of an acetate of deacetylated chitin.

13. A coated object having a coating thereon deposited from an emulsion comprising a wax emulsified in an aqueous solution of a salt of deacetylated chitin.

14. A coated object having a coating thereon deposited from an emulsion comprising a wax emulsified in an aqueous solution of an acetate of deacetylated chitin.

15. An object impregnated with a composition deposited from an emulsion comprising a water insoluble material liquid under the conditions of emulsification, emulsified in an aqueous solution of a salt of deacetylated chitin.

16. An object impregnated with a composition deposited from an emulsion comprising a water insoluble material liquid under the conditions of emulsification, emulsified in an aqueous solution of an acetate of deacetylated chitin.

17. A fabric having a coating thereon deposited from an emulsion comprising a water insoluble material, which is a liquid under the conditions of emulsification, emulsified in an aqueous solution of a salt of deacetylated chitin.

18. A paper having a coating thereon deposited from an emulsion comprising a water insoluble material, which is a liquid under the conditions of emulsification, emulsified in an aqueous solution of a salt of deacetylated chitin.

19. An emulsion comprising a substantially water insoluble material, which is a liquid under the conditions of emulsification, emulsified in an aqueous solution of a salt of deacetylated chitin, said emulsion containing a mold inhibitor.

GEORGE W. RIGBY.